Aug. 8, 1939. H. K. LORENTZEN Re. 21,174
MOUNTING FOR VENETIAN BLINDS
Original Filed March 14, 1936 3 Sheets-Sheet 1
Fig. I.
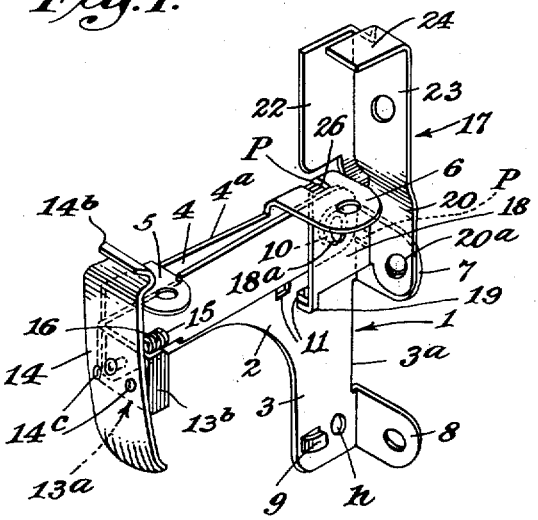
Fig. II.
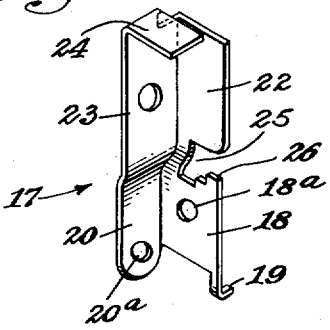
Fig. III.
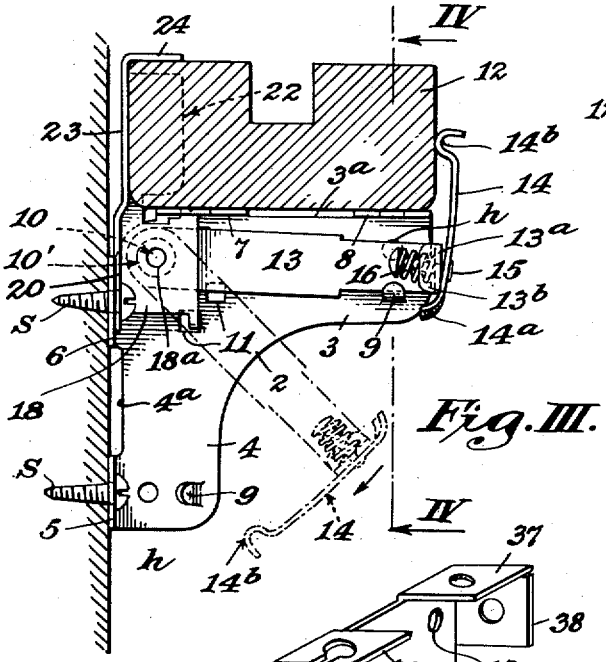
Fig. IV.
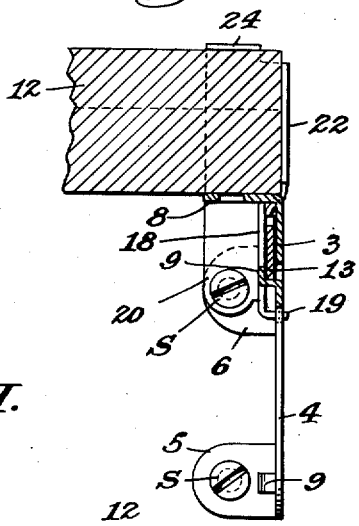
Fig. X.
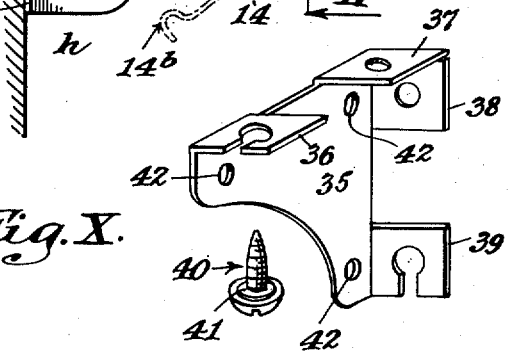
Fig. XI.
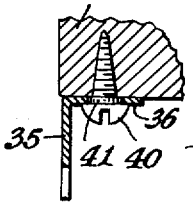
INVENTOR:
Hans K. Lorentzen
BY
Ramsey, Kent, Chisholm, & Lutz
his ATTORNEYS.

MOUNTING FOR VENETIAN BLINDS
Original Filed March 14, 1936 3 Sheets-Sheet 2
Fig. V.
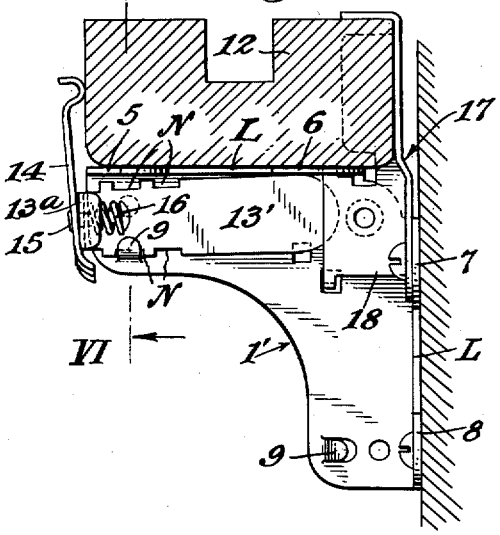
Fig. VI.
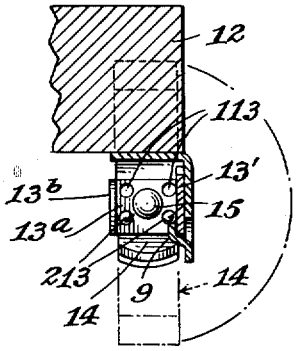
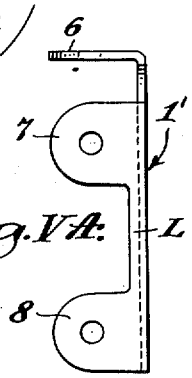
Fig. VA.
Fig. VII.
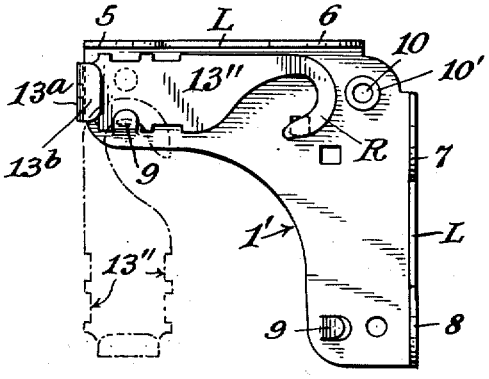
Fig. IX.
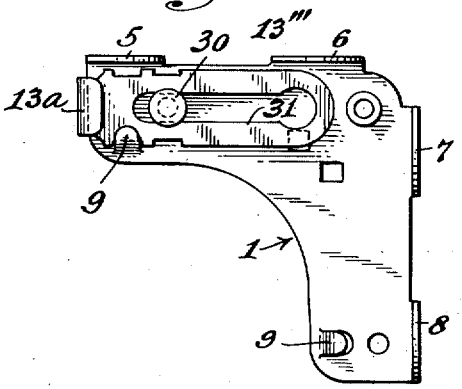
Fig. VIII.
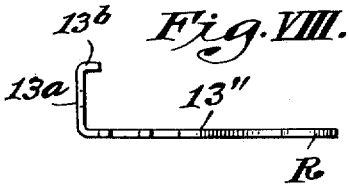
INVENTOR:
Hans K. Lorentzen
BY
Ramsey, Kent, Chisholm & Lutz
his ATTORNEYS.

Aug. 8, 1939. H. K. LORENTZEN Re. 21,174
MOUNTING FOR VENETIAN BLINDS
Original Filed March 14, 1936 3 Sheets-Sheet 3
Fig. XIII
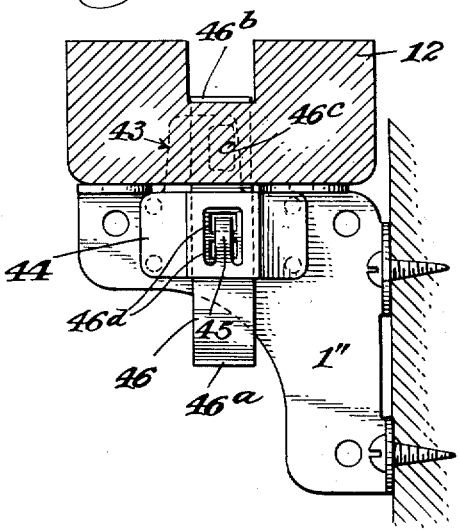
Fig. XII
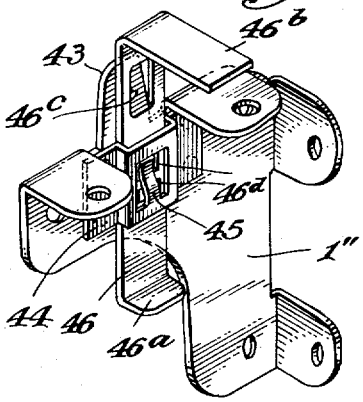
Fig. XVI
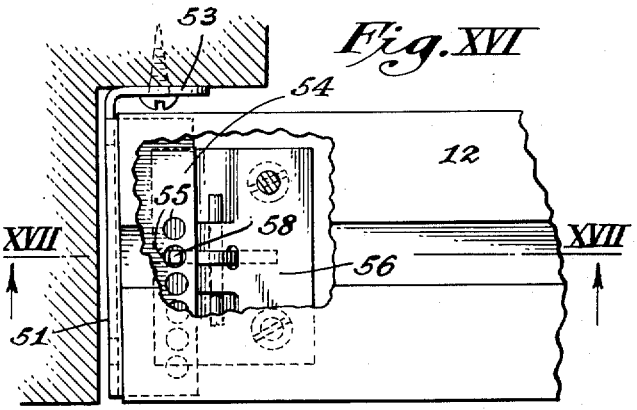
Fig. XVII
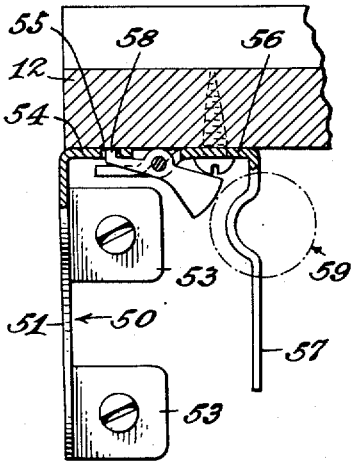
Fig. XIV
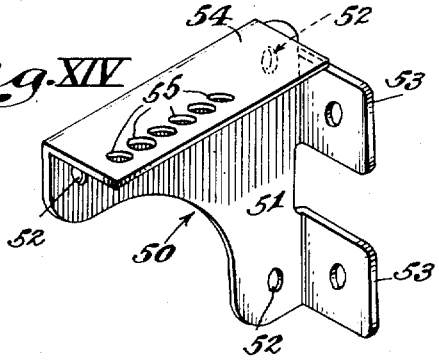
Fig. XV
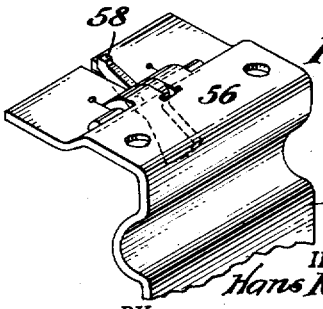
INVENTOR:
Hans K. Lorentzen
BY
Ramsey, Kent, Chisholm & Fitz
his ATTORNEYS.

UNITED STATES PATENT OFFICE 21,174

MOUNTING FOR VENETIAN BLINDS

Hans K. Lorentzen, Montclair, N. J., assignor to Lorentzen Hardware Manufacturing Corp., New York, N. Y., a corporation of New York Original No. 2,083,334, dated June 8, 1937, Serial No. 68,809, March 14, 1936. Application for reissue June 7, 1939, Serial No. 277,931

16 Claims. (Cl. 156—17)

This invention relates broadly to Venetian blinds and particularly to brackets for mounting the head-bars of Venetian blinds.

A Venetian blind consists of various slats and operating mechanism, all of which are suspended from, or carried by, a head-bar that is mounted at the top of the window. Sometimes the head-bar is mounted inside of the window frame, and other times it is mounted across the face or front of the window frame. Generally speaking, different brackets, are required for the two positions of mounting; and the brackets have to be paired, one right-hand bracket and one left-hand bracket, to take care of the two ends of the bar. Thus the bracket manufacturers and the blind installers have been compelled to make and stock a multiplicity of different brackets and bracket parts.

An object of the present invention is to provide Venetian blind mounting brackets of such construction that the same bracket can be used to mount the head-bar either within the window frame or across the face of the window frame.

Another object of the invention is to provide Venetian blind mounting brackets of such construction that all of the bracket parts, or the major portion of them, are reversible to enable the same parts to be used for, or in the assembly of, both right-hand and left-hand brackets.

A further object of the invention is to provide satisfactory and reliable Venetian blind mounting brackets which can be readily and economically stamped from sheet metal.

While a number of specific forms of the invention will be disclosed, it should be noted that certain major parts are either identical, or similar, in quite a number of the different forms.

Fig. I of the drawings is an isometric view of a complete head-bar bracket embodying the present invention. The bracket is one assembled for left-hand mounting and includes a left-hand retainer stamping.

Fig. II is an isometric view of a right-hand retainer stamping which may be assembled with other parts shown in Fig. I to form a bracket adapted for right-hand mounting.

Fig. III shows a head-bar mounted on a complete bracket installed as a right-hand bracket. The view shows the bracket primarily in side elevation and shows the head-bar and window frame in vertical section.

Fig. IV is a vertical section taken on the line IV—IV of Fig. III.

Fig. V illustrates a second form of the invention. The view is a vertical transverse section through a head-bar supported on a bracket installed as a left-hand bracket, the bracket appearing primarily in side elevation.

Fig. V^A is a rear elevation of the main stamping shown in Fig. V.

Fig. VI is a vertical section taken on the line VI—VI of Fig. V.

Fig. VII illustrates a third form of the invention. The view is a side elevation of certain bracket parts assembled as in left-hand mounting.

Fig. VIII is a bottom plan view of the hook member shown in Fig. VII.

Fig. IX illustrates a fourth form of the invention. The view is a side elevation of certain bracket parts assembled as in left-hand mounting.

Fig. X (sheet 1) is an isometric view showing a fifth form of bracket embodying the present invention.

Fig. XI is a detail vertical section showing the bracket of Fig. X mounted.

Fig. XII (sheet 3) shows a sixth form of the invention. The view is an isometric view showing a complete left-hand bracket.

Fig. XIII is a vertical section showing the bracket of Fig. XII mounted and supporting a head-bar.

Fig. XIV is an isometric view showing a supporting bracket used in a seventh form of the invention.

Fig. XV is an isometric view showing a fitting used in conjunction with the supporting bracket of Fig. XIV.

Fig. XVI is a plan view, with parts broken away, showing the elements of Figs. XIV and XV mounted and supporting a head-bar.

Fig. XVII is a vertical section taken on the line XVII—XVII of Fig. XVI.

*Figures I to XIV*

Designated as a whole by 1 is a one-piece sheet metal stamping, which is the main part that enters into most of the specific forms of the invention herein disclosed. This stamping has a planar body 2 formed with legs 3 and 4 which are of equal length and extend at right angles to each other. The legs have outside edges 3^a and 4^a which are also perpendicular to each other and correspond in general to the legs of an isosceles right triangle. Four wings 5, 6, 7, and 8 are stamped integrally with the body 2 and all project at right angles to the body on the same side thereof. Each of these wings is perforated, as shown, to receive mounting screws, such as screws S, to mount the bracket on the front or face of a window frame. In case the bracket is to be mounted inside of the window frame the screws will be inserted through holes *h* in the body 2.

Each of the legs 3 and 4 is provided with a small hook 9, struck out from the metal of the leg. The body 2 is provided with a round hole 10 which has its center on a line bisecting the angle formed by legs 3 and 4 (or edges 3ᵃ and 4ᵃ). Preferably this hole 10 is so stamped that the displaced metal is formed into a short tube 10′ which has one end integral with the body 2. This short tube can then be made to serve as a tubular rivet, as will be referred to later. Positioned symmetrically on opposite sides of a line bisecting the angle of the legs, are rectangular holes 11.

It will be seen that all of the elements thus far described are part of a single metal stamping 1 and that the stamping is symmetrical about a line which bisects the angle formed by the edges 3ᵃ and 4ᵃ. Thus, this stamping can be reversed for either right-hand or left-hand mounting. When mounted left-hand as indicated in Fig. I, the wings 7 and 8 are available for attachment to the upright front surface of a window frame, while the wings 5 and 6 are available to support the top bar 12. When the stamping 1 is mounted right-hand as shown in Fig. III, the wings 5 and 6 are available for attachment to the upright front surface of the window frame, while wings 7 and 8 are available to support the top bar. In either right-hand or left-hand position the holes *h* may be used to attach the bracket inside of the window frame.

A sheet metal arm 13 has a laterally extending end portion 13ᵃ and a reversely extending tip 13ᵇ. Affixed to the end 13ᵃ is a cross-head 14 of the form shown. A pin 15, biased inwardly by a spring 16, forms a yielding attachment for the cross-head 14 and permits the cross-head to be forcibly withdrawn from end 13ᵃ for a slight distance. One end of the cross-head is formed into a knurled thumb piece 14ᵃ, and the other end is formed into a rounded nose 14ᵇ. The inner end of the arm 13 is pivotally secured to stamping 1 at hole 10. This pivotal attachment is of a hollow rivet type, and may be made with an ordinary type of hollow rivet. Preferably, however, the metal displaced from hole 10 is formed into an integral short tube (as previously described) and this tube is used as a hollow rivet to secure arm 13.

Fig. III clearly shows how cross-head 14 acts as a retaining finger to hold the head-bar 12 against accidental forward movement. This figure also shows how arm 13 can be shifted from one leg of stamping 1 to the other leg thereof, to permit either right-hand or left-hand mounting of the bracket. Cross-head 14 is provided with two punch marks 14ᶜ which make small projections on the back side of the cross-head. Arm end 13ᵃ has two pairs of small holes, as 113 and 213 in Fig. VI. Each of these pairs of holes corresponds to punch marks 14ᶜ, one pair of such holes being below pin 15 and the other pair being above pin 15. When the parts are in the position shown in full lines in Fig. III, the punch marks 14ᶜ enter the lower pair of holes in arm end 13ᵃ, and hold the cross-head 14 in a vertical position. However, by forcibly moving the cross-head a short distance away from arm end 13ᵃ, the cross-head may be inverted on pin 15 (per the arrow in Fig. VI) to the position shown in dot-dash lines in Fig. III. Punch marks 14ᶜ then enter the other pair of holes in arm end 13ᵃ and hold the cross-arm in the new position. Arm 13 is sufficiently resilient to permit it to be flexed sidewise (after being raised above hook 9) and swung past hooks 9 into operative position on the other leg of stamping 1. Thus the supporting bracket (including stamping 1, arm 13, and cross-head 14) is completely reversible for either right-hand or left-hand mounting.

Fig. II shows a separate sheet metal stamping, designated as a whole by 17, which is used as a part of each complete bracket, to act as a retainer which holds the top bar against backward, upward, and endwise movement. These stampings 17 are made both right and left-hand, a right-hand one being used with the supporting bracket 1 which is mounted at the right end of bar 12, and a left-hand one being used with the supporting bracket 1 which is mounted at the left end of bar 12. A right-hand retainer is shown in Fig. II and a left-hand retainer in Fig. I, but for the sake of convenience, the same reference characters will be used for both right-hand and left-hand retainers.

Retainer 17 includes a flat portion 18 which has a hole 18ᵃ so positioned that when the retainer is assembled in a bracket, the hole 18ᵃ aligns with the hole of the rivet at 10 (see Fig. III). A small finger 19 is adapted to enter one of the bracket holes 11, depending upon whether the assembly is being made for right-hand or left-hand mounting. At right angles to the portion 18 there is another portion 20 perforated at 20ᵃ. The hole 20ᵃ is adapted to align with the hole in either bracket 6 or 7, depending upon whether the stamping 1 is being used right-hand or left-hand. Above portion 18 there is flat portion 22 which is offset outwardly to lie flush with the outer surface of stamping 1. Above the portion 20 there is a portion 23 which is offset forwardly to space the blind away from the window. Bent from portion 23 is a horizontal member 24 which holds bar 12 down. Between portions 18 and 22 there is a notch 25, of the form shown, providing a projection 26. When the retainer 17 is assembled with the bracket 1 as shown in Fig. I, the projection 26 enters the slot P in either wing 6 or 7. When the bracket is to be mounted on the front of a window frame, upper screw S (Fig. III passes through hole 20ᵃ (as well as through the wing of stamping 1) thereby holding the parts in the assembled position, as is best shown in Fig. I. When the bracket is mounted inside of a window frame, a screw is inserted through hole 18ᵃ and the hole of the rivet at 10, to similarly hold the parts together.

It will be seen that the foregoing construction provides for complete right-hand and left-hand brackets; and that with the exception of retainer 17, all parts are reversible for either right-hand or left-hand mounting. Since retainer 17 is the only part which has to be separately manufactured and stocked in rights and lefts, the construction provides a very considerable economy in tools, dies, and stock.

*Figs V and VI*

The construction shown in these figures duplicates the construction shown in Figs. I to IV except for a change in the arm which carries cross-head 14 and a slight optional modification of the main bracket stamping. The cross-head 14, arm end 13ᵃ, pin 15, and spring 16 are all identical with the construction shown in Figs. I to IV. However, the body of the arm, designated at 13', is provided with notches N and the arm is not fixedly attached to the main stamping, designated as a whole by 1'. The arm 13' is telescopically applied to the leg of stamping 1', so that the rounded end of the arm projects behind portion 18 of retainer 17 and one of the notches N interlocks with hook 9. When the arm 13' is to be applied to a bracket of opposite hand, the cross-head 14 is inverted as previously described and as indicated in Fig. VI; and then a notched N on the opposite edge of arm 13' functions to interlock with the other hook 9.

Main bracket stamping 1' may be identical with stamping 1, but preferably differs therefrom by having narrow laterally projecting ledges L which extend between wings 5 and 6 and also between wings 7 and 8. Such a ledge provides a convenient sliding surface for the end of arm 13' as the arm is telescoped to the position shown in Fig. V. The provision of a plurality of notches N on each side of arm 13', adapts the construction for holding different widths of head-bar 12.

*Figs. VII and VIII*

The main bracket stamping 1' is identical with stamping 1' of Fig. V. Arm 13'' may differ from arm 13' only in that the inner end is formed into a hook R. This hook R permits the arm to be conveniently suspended from hook 9, in the position shown in dotted lines, while the head-bar is being removed or replaced. If desired arms 13'' may be manufactured in pairs, as right and lefts, so that hook R will point downwardly on both right-hand brackets and left-hand brackets, but that is not essential. It will, of course, be understood that arm end 13a is to be provided with a cross-head 14, as previously; and that a retainer 17 may be used with the bracket.

*Fig. IX*

The main bracket stamping 1 is identical with the stamping 1 in Fig. I. Affixed to one leg of the stamping is a flat headed pin 30; and the arm 13''' is formed with a keyhole slot 31 which permits the arm to be reciprocated on pin 30 and be engaged and disengaged from the pin. End 13a of the arm 13''' is the same as the end 13a in previous forms of the invention, and it will be understood that a cross-head 14 is to be affixed thereto as previously described. Also a retainer 17 is preferably used as in previous forms of the invention. Of course, the pin 30 may be duplicated on the other leg of stamping 1 to permit the arm 13''' to be transferred to the other leg.

*Figs. X and XI*

Stamping 35 has two perpendicular legs and is provided with wings 36, 37, 38 and 39. As shown in the drawings, the wings 37 and 38 are provided with round screw holes, and the wings 36 and 39 are provided with keyhole slots. The bracket may be secured to the face of a window frame by screws passed through wings 38 and 39. A single screw 40, having a shoulder 41, may be used to secure the head bar 12 to the bracket. When the head bar is in place on the bracket, shoulder 41 enters the circular portion of the keyhole slot in wing 36 and secures the head bar against movement. However, by merely loosening the screw slightly, the shank of the screw may be passed through the slotted portion of the keyhole opening and the bar removed from the bracket without removing the screw from the bar. Stamping 35 may also be provided with holes 42 for mounting the bracket inside of a window frame. It will be noted that the bracket is symmetrical about a line which bisects the angle of the legs and that therefore the bracket is reversible for either right-hand or left-hand mounting.

*Figs. XII and XIII*

Bracket stamping 1'' is similar to, but not identical with, the stamping 1 previously described. One leg of the stamping has an upwardly extending brace or clamping portion 43; and on this leg there is welded a strap 44 having a spring finger 45. This strap provides a loop which retains a reciprocable clamping member 46. Clamping member 46 is provided with a lower lateral extension 46a which may be grasped to reciprocate the clamping member, and is provided with an upper lateral extension 46b which enters the groove in the top of the head bar 12 and secures the head-bar to the bracket. The stationary clamp-bearing portion 43 serves to support the upper vertical part of clamping member 46 against outward bending or flexing.

Preferably clamping member 46 is provided with a recess or aperture 46c, which is placed beneath the spring finger 45 while the strap 44 is being welded to the stamping 1''. This arrangement relieves the tension of spring finger 45 during the welding operation and thereby makes it easier to hold the parts in position for welding. Also aperture 46c permits the spring 45 to be relieved of tension while the bracket is in stock. Optionally, clamping member 46 may also be provided with one or more other recesses or apertures 46d into one of which spring finger 45 snaps when the clamp 46 is in bar-clamping position.

With this form of the invention, members 44 and 46 are reversible for the assembly of right-hand and left-hand brackets, but the finished brackets must be made as rights and lefts. The particular main stamping shown at 1'' is also not reversible, but a reversible stamping, such as stamping 1 (Fig. I) may be substituted, if desired.

*Figs. XIV to XVII*

With this form of the invention the head-bar 12 is supported on brackets which are designated as a whole by 50. Only a left-hand bracket is illustrated, but it will be understood that the brackets are made as rights and lefts. The bracket has a planar body 51, provided with holes 52 for inside mounting. Wings 53 provide for front mounting. At the top of the bracket there is a horizontal shelf 54 having a series of holes 55. Secured to the underside of bar 12 is a metal stamping having a horizontal portion 56 and a depending portion 57. Carried by the horizontal portion is a counterweighted latch 58.

With the latch 58 held out of the way, the bar 12 can be put on, or taken off of, the bracket. The depressed end of portion 56 slides beneath shelf 54, and when the latch 58 is released it may readily be engaged in one of the holes 55. This construction permits ready adjustability of the position of the head-bar to place the blind at different distances from the window.

Depending portion 57 is preferably so made that it will receive and support the tilt bar (not shown) of the blind and the blind tilting mechanism. Such mechanism is indicated diagrammatically at 59. As the interlocking fittings at the two ends of the tilt bar may be different, the members having depending portions 57 may be manufactured as rights and lefts to provide the desired supporting formations at the two ends of the bar.

In compliance with the patent statutes, I have disclosed the best forms in which I have contemplated embodying my invention, but it will be understood that these forms are illustrative only.

What is claimed is:

1. In a bracket for mounting the head-bar of a Venetian blind, a one-piece sheet metal stamping which is turnable for right-hand or left-hand mounting, said stamping comprising: a planar body having two outside edges which are of equal length and perpendicular to each other, and four wings positioned respectively adjacent to the four ends of said two perpendicular edges, all of the wings extending perpendicular to the body on the same side thereof, and the entire stamping being operatively symmetrical about a line bisecting the angle formed by said two outside edges whereby the stamping may be mounted either right-hand or left-hand; and head-bar retaining means carried by said planar body and shiftable into operative position to retain the head-bar whether the bracket be mounted right-hand or left-hand.

2. In a bracket for mounting the head-bar of a Venetian blind, a one-piece sheet metal stamping comprising: a planar body having two outside edges which are of equal length and are perpendicular to each other, and wings projecting from said edges, all of the wings being perpendicular to said body and on the same side thereof, and there being mounting holes in the body and also in at least some of the wings whereby the bracket may be mounted either on the front or the jamb of a window frame; a pin attached to the body and located on a line bisecting the angle formed by said outside edges; and head-bar retaining means mounted on the pin and shiftable into operative position with respect to either outside edge of the stamping whereby the bracket may be mounted either right-hand or left-hand.

3. A bracket for mounting the head-bar of a Venetian blind, comprising: a planar body having two perpendicular legs of equal length; wings projecting laterally from each of the legs, the wings of either leg being adapted to mount the bracket on a vertical frame while the wings of the other leg support the head-bar; bar retaining means movable into and out of position to hold a head bar mounted on the bracket; and means on each of said legs to support the bar retaining means in bar holding position, the bar holding means being shiftable to operative position on either of said legs to permit the bracket to be mounted either right-hand or left-hand.

4. A bracket for mounting the head-bar of a Venetian blind, comprising: a metal body having two perpendicular legs either of which may be positioned vertically to mount the bracket while the other extends horizontally to support a head-bar, a movable arm, means to retain the arm adjacent to either of said legs, and a bar-retaining finger attached to said arm, the arm being shiftable from one of said legs to the other and the finger being invertible on the arm, to permit the bracket to be mounted either right-hand or left-hand.

5. In a structure for mounting the head-bar of a Venetian blind, a retainer piece having portions to engage the end and back of the bar, and a bracket for supporting the bar, the bracket being turnable for either right-hand or left-hand mounting and having means to receive either a right-hand or a left-hand retainer piece.

6. In a structure for mounting the head-bar of a Venetian blind; a retainer piece of stamped sheet metal having portions to engage the end, back, and top of a head-bar; and a bracket of stamped sheet metal having two perpendicular legs, the bracket being formed to interfit with a retainer piece and being operatively symmetrical about a line bisecting the angle formed by its legs, whereby the bracket may be mounted either right-hand or left-hand and receive either a right-hand retainer piece or a left-hand retainer piece.

7. A bracket for mounting the head-bar of a Venetian blind, comprising; a sheet metal stamping having a vertical edge and a horizontal edge, a sheet metal strap secured to said stamping, the strap having an integral spring finger; and a vertically movable bar-clamping member secured by said strap, said spring finger engaging said bar-clamping member and restraining movement thereof.

8. A bracket for mounting the head-bar of a Venetian blind, comprising: a sheet metal stamping having two perpendicular legs and a clamp-bearing portion projecting from one of the legs, a sheet metal strap secured in alignment with said clamp-bearing portion, and a bar-clamping member retained by said strap, the bar-clamping member extending in the direction of said clamp-bearing portion and being reciprocable in such direction.

9. A bracket for mounting the head-bar of a Venetian blind, the bracket being turnable for right-hand or left-hand mounting and comprising: a metal body having two perpendicular legs; an arm pivoted at one end to the body by a pivot located on a line bisecting the angle formed by the legs, the arm being shiftable from one leg to the other and there being retaining means for the arm on each of the legs; and a head attached to the free end of the arm, the head extending on both sides of the arm.

10. A bracket for mounting the head-bar of a Venetian blind, the bracket being turnable for right-hand or left-hand mounting and comprising: a metal body having two perpendicular legs; an arm pivoted at one end to the body by a pivot located on a line bisecting the angle formed by the legs, the arm being shiftable from one leg to the other and there being retaining means for the arm on each of the legs; and a head yieldingly attached to the free end of the arm, the head projecting upwardly from the arm and being invertible thereon.

11. A structure for removably mounting the head-bar of a Venetian blind, comprising: a bracket having a horizontal shelf to support one end of the head-bar; a member to be permanently attached to the under side of the head-bar; and a biased catch carried by said member, the catch being positioned to pass under said shelf and the shelf being formed to interlock with the catch.

12. A structure for removably mounting the head-bar of a Venetian blind, comprising: a bracket having a horizontal shelf to support one end of the head-bar; a member to be permanently attached to the head-bar; and a biased catch carried by said member, the catch being positioned to engage said shelf and the shelf having a series of holes any one of which may receive the catch.

13. A bracket for mounting the head-bar of a Venetian blind, comprising: a planar body having two perpendicular legs of equal length; wings projecting laterally from each of the legs, the wings of either leg being adapted to mount the bracket on a vertical frame while the wings of the other leg support the head-bar; and head-bar retaining means movable into and out of position to hold a head-bar mounted on the bracket, said retaining means being shiftable to operative position on either of said legs to permit the bracket to be mounted either right-hand or left-hand.

14. A bracket for mounting the head-bar of a Venetian blind, comprising: a metal body having two perpendicular legs either of which may be positioned vertically to mount the bracket while the other extends horizontally to support a head-bar, a movable arm, means to retain the arm adjacent to either of said legs, and a bar-retaining finger attached to said arm, the arm being shiftable from one of said legs to the other to permit the bracket to be mounted either right-hand or left-hand.

15. A bracket for mounting the head-bar of a Venetian blind, comprising: a sheet metal stamping having a vertical edge and a horizontal edge, a vertically movable bar-clamping member positioned against the face of said stamping, and means securing said bar-clamping member to the stamping and urging it against the stamping by spring pressure.

16. A bracket for mounting the head-bar of a Venetian blind, the bracket being turnable for right-hand or left-hand mounting and comprising: a metal body having two perpendicular legs; an arm secured to the body by a pivot located on a line bisecting the angle formed by the legs, the arm being shiftable on the pivot from one leg to the other and there being retaining means for the arm on each of the legs; and a lateral extension on the end of the arm to engage a head-bar supported by the bracket.

HANS K. LORENTZEN.